United States Patent [19]

Mytels

[11] Patent Number: 4,652,983

[45] Date of Patent: Mar. 24, 1987

[54] PARABOLIC-SHAPED REFLECTING SHADE

[76] Inventor: Michael Mytels, 2824 Louis Rd., Palo Alto, Calif. 94303

[21] Appl. No.: 824,112

[22] Filed: Jan. 30, 1986

[51] Int. Cl.$^4$ ............................................. F21V 7/18
[52] U.S. Cl. ................................... 362/220; 362/247; 362/241; 362/260
[58] Field of Search ............... 362/220, 225, 247, 248, 362/241, 260

[56] References Cited

U.S. PATENT DOCUMENTS 4,336,576 6/1982 Crabtree .............................. 362/247

FOREIGN PATENT DOCUMENTS

| 581451 | 9/1924 | France ............................... | 362/225 |
| 2308051 | 4/1976 | France ............................... | 362/220 |
| 6410577 | 3/1966 | Netherlands ........................ | 362/220 |

*Primary Examiner*—Larry I. Schwartz
*Attorney, Agent, or Firm*—Hamrick, Hoffman, Guillot & Kazubowski

[57] ABSTRACT

A light-weight reflecting shade that is to be mounted on a fluorescent tube as it is normally disposed within a ceiling light fixture and including (i) a plurality of elongated spreaders that are located in spaced apart parallel relationship with one another, (ii) a plurality of hanger means that slideably connect with selected ones of, or all of, the spreader means and are adapted to be positioned to receive and attach to the fluorescent tube, and (iii) a resilient sheet means affixed to the plurality of spreader means. The sheet means has a highly reflective surface on the side facing the fluorescent tube, has one dimension substantially equal to the length of the fluorescent tube and a second dimension that is substantially greater than the length of the elongated spreader means. In use, the hanger means engages and is supported by the fluorescent tube, and in turn supports the spreader means and the resilient sheet means.

14 Claims, 10 Drawing Figures

PARABOLIC-SHAPED REFLECTING SHADE

BACKGROUND OF THE INVENTION

1. Field of the Invention

This invention relates to a reflecting shade for mounting on a fluorescent tube, and more particularly to a light-weight, curved reflecting shade for mounting directly on a fluorescent tube to provide a curved reflector for reflecting downwardly substantially all of the luminous energy radiated from the upper surface of a fluorescent tube.

2. Description of the Prior Art

The price of energy, especially electrical power, has forced many conservation measures and attempts to improve the efficiency of devices consuming electricity. For example, fluorescent lights in buildings use significant electrical energy, and during the recent energy crises, various steps have been taken to reduce consumption of electrical energy by fluorescent lights. One step involved removal of one or more fluorescent tubes in light fixtures utilizing multiple fluorescent tubes. This in turn led to the use of small reflective shade devices in an attempt to increase the light output from the reduced number of fluorescent tubes.

Various reflective shades have been known in the prior art. In one embodiment, the transverse plates of the shade are designed with the apertures for the fluorescent tube, and the plates cannot be opened. Mounting of the shade thus requires removal of the fluorescent tube from its fitting. Further, this design with the transverse plates surrounding the fluorescent tube requires a clearance to the shade which limits the number of types of fluorescent fixtures in which the shade can be used.

Another retrofit apparatus for fluorescent fixtures is shown in U.S. Pat. No. 4,336,576 to Daniel B. Crabtree. The problem with such approach is that it does not provide a universally applicable device that can be applied to most existing fluorescent fixtures without requiring modification of the fixture and/or the retrofit device. Furthermore, installation of the device requires removal of all bulbs and in most if not all cases, at some modifications of the existing light fixture.

Reflective shades are known which permit mounting of the shade without requiring removal of the fluorescent tube from its fixture. These prior art shades have various short-comings. Some employ resilient clamping members that make production of the shade expensive and the clamping member can damage the fluorescent tube if appropriate care is not used.

Another reflective shade is disclosed in Danish Patent Publication No. (11). 144575 B. This shade has two substantially uniform shade halves, each of which describes a part of a curved surface parallel to the axis of the fluorescent tube. Each shade half is interconnected with a number of transversely oriented plates disposed in spaced apart relationship along the length of the shade. The lateral edges of the plates have a curvature corresponding to the curvature of the shade halves and the lateral surface of the plates are secured to the shade halves. This shade has several deficiencies including its limited width and centralized aperture for receiving and holding the fluorescent tube. Further, this prior art shade has one fixed location for receiving and holding the fluorescent tube.

Accordingly, there is a need for an improved reflecting shade that gives a wide band of uniform light output across the fixture in which it is to be used. Also, there is a need for a reflecting shade having a hanger means that is laterally movable so the hanger can be moved into position to receive and attach to the fluorescent tube wherever located in a particular light fixture.

SUMMARY OF THE PRESENT INVENTION

It is therefore an object of the present invention to provide a light-weight reflecting shade which can be mounted on a fluorescent tube in a ceiling light fixture, and which will reflect downwardly substantially all of the luminous energy radiated from the upper surface of the tube.

Another object of the present invention is to provide a light-weight reflecting shade which can be mounted on a fluorescent tube, and which has a hanger means that is laterally movable to enable moving of the hanger means into position to receive and attach to the fluorescent tube wherever it is located in the light fixture.

Yet another object of the present invention is to provide a light-weight reflecting shade which can be mounted in a fluorescent fixture where one or more of the fluorescent tubes have been removed from the fixture.

Still another object of the present invention is to provide a light-weight reflecting shade which can be mounted in a fluorescent fixture without removing any of the fluorescent tubes.

A still further object of the present invention is to provide a light-weight reflecting shade which can be placed around several lamps in a fixture irrespective of the spacing among the lamps.

Another object of the present invention is to provide a light-weight retrofitable reflecting shade having a plurality of light dividing means disposed along the longitudinal axis of the fluorescent tube to restrict the illumination angle in the longitudinal direction.

Briefly, these and other objects of the present invention are achieved by apparatus in the form of a light-weight reflecting shade that is to be mounted on a fluorescent tube as it is normally disposed within a ceiling light fixture. The reflecting shade includes (i) a plurality of elongated spreaders that are located in spaced apart parallel relationship with one another, (ii) a plurality of hanger means that slideably connect with selected ones of, or all of, the spreader means and are adapted to be positioned to receive and attach to the fluorescent tube, and (iii) a resilient sheet means affixed to the plurality of spreader means. The sheet means has a highly reflective surface on the side facing the fluorescent tube, has one dimension substantially equal to the length of the fluorescent tube and a second dimension that is substantially greater than the length of the elongated spreader means. In use, the hanger means engages and is supported by the fluorescent tube, and in turn supports the spreader means and the resilient sheet means.

In one embodiment, the resilient sheet means is in the form of a single sheet, the edges of which are removably engaged with one end of each of the spreader means. In another embodiment, the resilient sheet means is in the form of two sheets that have abutting edges removably engaged with each other, such as by an adhesive strip, with the other edges of said sheets removably engaged with one end of each of the spreader means.

In another embodiment, the hanger means has pivotally connected hanger plates, each of which include cut-outs that together define a circular cavity which can be opened to receive and then be closed to surround the fluorescent tube. The hanger means has one plate sideably engaged with the spreader means and has the other plate capable of being pivoted between an open and closed position controlled through the use of detents.

Another embodiment of the hanger means includes a single component with an open hook and a rounded dove-tailed rail button that slideably engages a dove-tailed groove formed in the spreader means. The single component hanger means has rounded detents which serve as positioning means for the hanger means in relation to the the spreader member. One detent holds the hanger in a closed position about the fluorescent tube while the other detent positions the hanger mean in a open position to receive and then be closed around the fluorescent tube.

Still another embodiment of the invention has two plate members jointly defining a cavity to hold a fluorescent tube. The plate members are slideably connected by dove-tailed rails disposed within a dove-tailed groove in the spreader member. The two plate members have bead-chain means, or the like, removably securing the plate members together. When the chain is removed, the plates may be separated by sliding, and when a fluorescent tube is positioned between them, the plate members may be moved together around the tube and held together by the chain.

IN THE DRAWING

DESCRIPTION OF THE PREFERRED EMBODIMENTS

Figure 1:
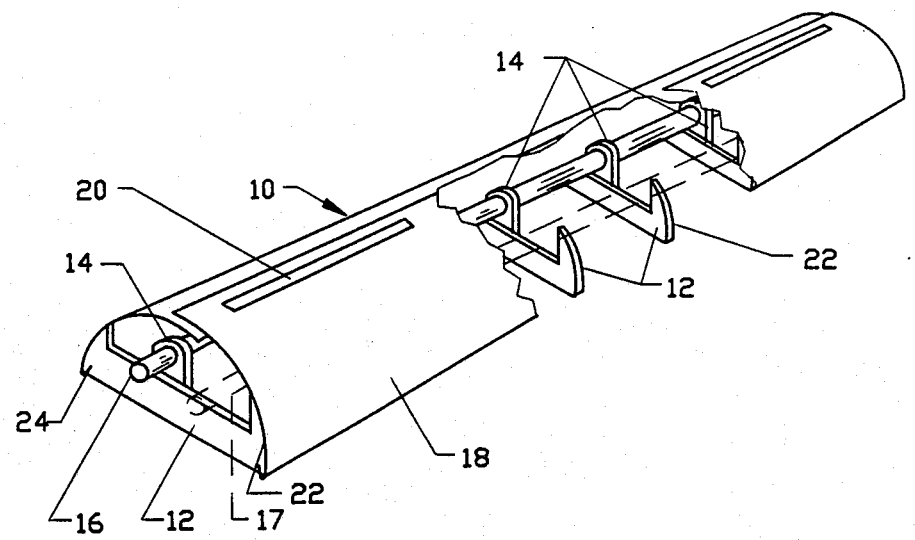
FIG. 1 is a perspective view of an embodiment of a light-weight reflecting shade according to the teaching of the present invention.

Referring now more specifically to FIG. 1 of the drawing, a light weight reflecting shade 10 according to the present invention is provided with a plurality of elongated spreader means 12 disposed in a spaced apart parallel relationship. Selected spreader means 12 have slideably connected thereto hangar means 14, and the hanger means 14 are slideably movable across the length of the spreader means 12. Further, the hanger means 14 are shown attached to a fluorescent tube 16 that is mounted within a ceiling fixture. A second tube 17 may be either present or removed. All of the spreader means 12 have edge portions 22 in the form of fins, or the like, with a curvature on their edges that serve to support resilient sheet means 18, and each spreader means 12 has connecting means 24 in the form of slots at each end that receive the corresponding folded end of resilient sheet means 18 in a disengageable connection.

The resilient sheet means 18 in FIG. 1 is of sufficient length (a first dimension) to be approximately equal to that of the conventional fluorescent bulb 16 and is of a width (a second dimension) substantially greater than the length of the spreader member 12. In this arrangement, the resilient sheet means 18 forms a curved canopy over the spreader members 12 which also covers the length of the fluorescent tube 16. Sheet means 18 is made of very light weight material, typically plastic, that is coated or lined, on the surface adjacent fluorescent tube 16, with a highly reflective material such as a metalized foil, or the like. Conventional practices are used to obtain an attractive decorative appearance to both sides of the sheet means 18, with the side adjacent the fluorescent tube 16 being a bright metallized finish. Adhesive strips 20 are provided on the outside of sheet means 18 to further support shade 10 within a conventional light fixture by having the strips 20 contact and removably seal to the housing of the light fixture.

Figure 2:
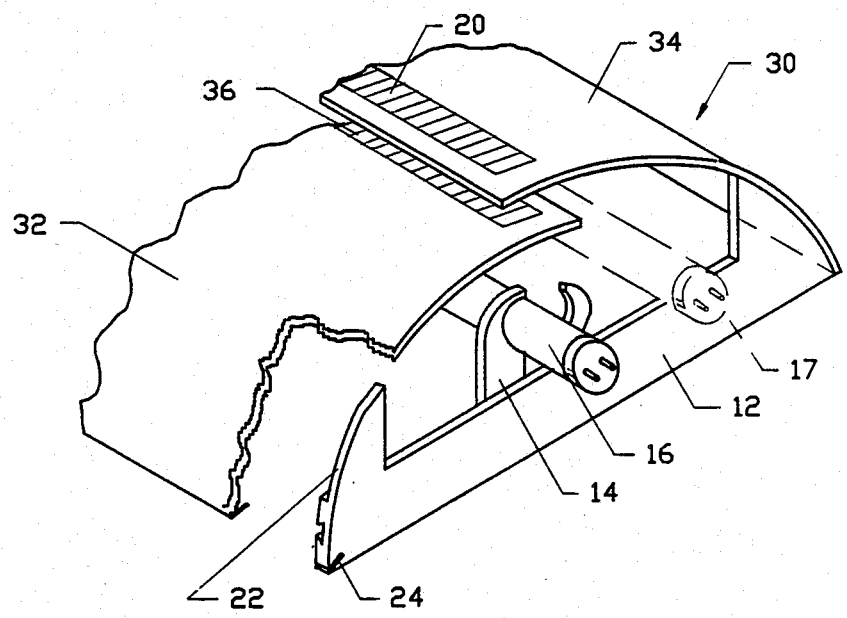
FIG. 2 is a perspective view of an end portion of the light-weight reflecting shade of the present invention.

Another light-weight reflecting shade 30 according to the present invention is disclosed in FIG. 2. In this embodiment, the plurality of elongated spreader means 12 (only one of which is shown) have edge portions 22 in the form of fins with a curvature on their edges adapted to support resilient sheet means in the form of two separate sheets 32 and 34. In this arrangement, the sheets 32 and 34 together form a curved canopy over the spreader members 12 that covers the length of the fluorescent tube 16. Sheet 32 is provided with an adhesive strip (or strips) 36 that removably connects with sheet 34.

Other conventional means of connecting resilient sheet means 18 to the plurality of spreader means 12 can also be used.

Figure 3:
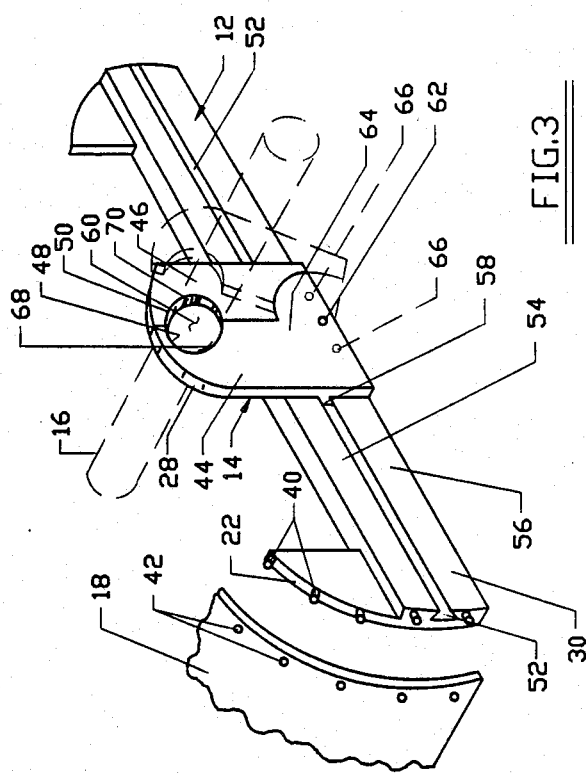
FIG. 3 is a perspective view of the spreader means and a hanger means according to the teaching of the present invention.

In another embodiment shown in FIG. 3, the spreader means 12 may be secured to the resilient sheet means 18 by providing a number of very small nubs or buttons 40 along the edge portions 22 of spreader members 12 for insertion into aligned small cavities or indentations 42 on the contacting surface of the shade means 18.

Figure 4:
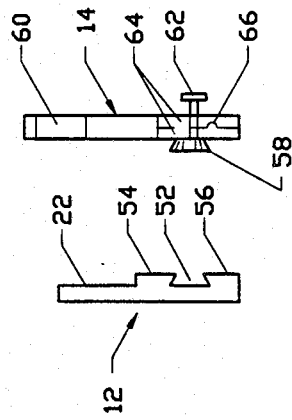
FIG. 4 is an exploded end view of the spreader means and the hanger means as employed according to one teaching of the present invention.

As more fully illustrated in FIGS. 3 and 4, hanger means 14 are slideably connected with at least some of the spreader means 12 and serve to hold the shade 10 on the fluorescent bulb 16. Due to the slideable connection, hangar means 14 can be positioned along spreader means 12 as required to support the fluorescent tube 16. Spreader means 12 is provided with a dove-tailed groove 52 formed beyween upper and lower wall portions 54 and 56. of spreader means 12. One portion 44 of hanger means 14 is provided with a dove-tailed rail 58 extending substantially thereacross that slideably connects into the dove-tailed groove 52 and permits lateral movement of the hangar means 14 along the length of spreader member 12 so as to be in a position to be opened and have opening (cavity) 60 of the hangar means 14 receive and enclose fluorescent tube 16.

Hangar means 14, as shown in FIG. 3, consists of two hanger plates 44 and 46 which, in one preferred embodiment, include semicircular cut-out portions 48 and 50, respectively, that together form a circular cavity 60 for surrounding and enclosing a fluorescent tube 16. The hanger plates 44 and 46 are pivotally connected by a means of a pivot pin 62 so as to permit opening thereof by rotating hanger plate 46 in the direction of the arrow shown in FIG. 3. Reference is made to the phantom outline showing the hanger plate 46 in an open position.

In the illustrated embodiment, the hangar components 44 and 46 pivotally connect with each other and have an overlap area consisting of a flange portion 64 on hanger plate 44 that is connected with a flange portion 64 of hanger plate 46. Each flange portion 64 is half the thickness of hanger plates 44 and 46. The pivot pin 62 is located generally in the center of the flange portions 64 so as to pivotally connect the two hangar plates with the semicircular cavity portions 48 and 50 facing each other. This enables control of the turning movement of hangar component 46 between an open and a closed position.

Controlled movement of the hanger components 44 and 46 between the open and closed position, as illustrated in FIG. 3, is aided by locking detents 66. The locking detents 66 can consist of a small semicircular nub in one of the hanger components (component 44) and correspondingly located semicircular depressions in the other bracket component 46. Both detents are engaged when the hanger means is in a closed position.

As the opening 60 in the hangar means 14 is designed with a little larger diameter than the diameter of the fluorescent tube 16, semicircular cavity portions 48 and 50 may be provided at the edges thereof with a coating, at 68 and 70, of an elastomeric material for engagement against the fluorescent tube 16. Instead of a coating, a projection may also be used consisting of a rubber plug insertion into a matching hole at the edge of the semicircular cavity portions 48 and 50.

Figure 5:
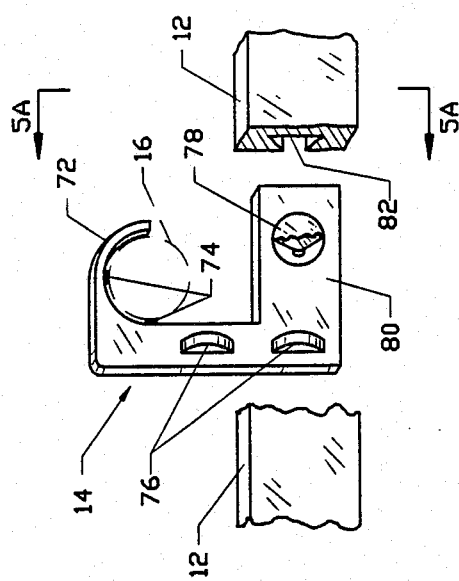
FIG. 5 is a frontal view of another embodiment of the hanger means showing its relationship with the spreader means.
Figure 5A:
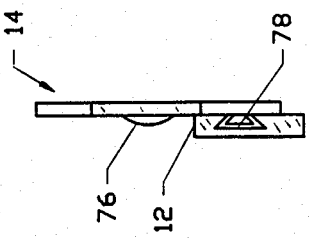
FIG. 5A is an end view of the embodiment of FIG. 5.

Another embodiment of the hanger means 14 is shown in FIGS. 5 and 5A. The hanger means 14 has a hook portion 72 in the form of an open that is designed to be placed over the fluorescent tube 16. Coating pads 74 or the like, as previously discussed, are provided on the inside of hook 72 for engagement with and protection of the fluorescent tube 16. A dove-tailed button 78 in rounded form is provided on the base 80 of hangar means 14 to engage the dove-tailed groove 82 of spreader means 12. Two rounded detents 76 are provided on hanger means 14, with the lower detent engaging the groove when the hanger means 14 is in its closed position, and the upper detent 76 engaging the groove when the hanger means 14 is rotated into its open position to receive the fluorescent tube 16.

Figure 6:
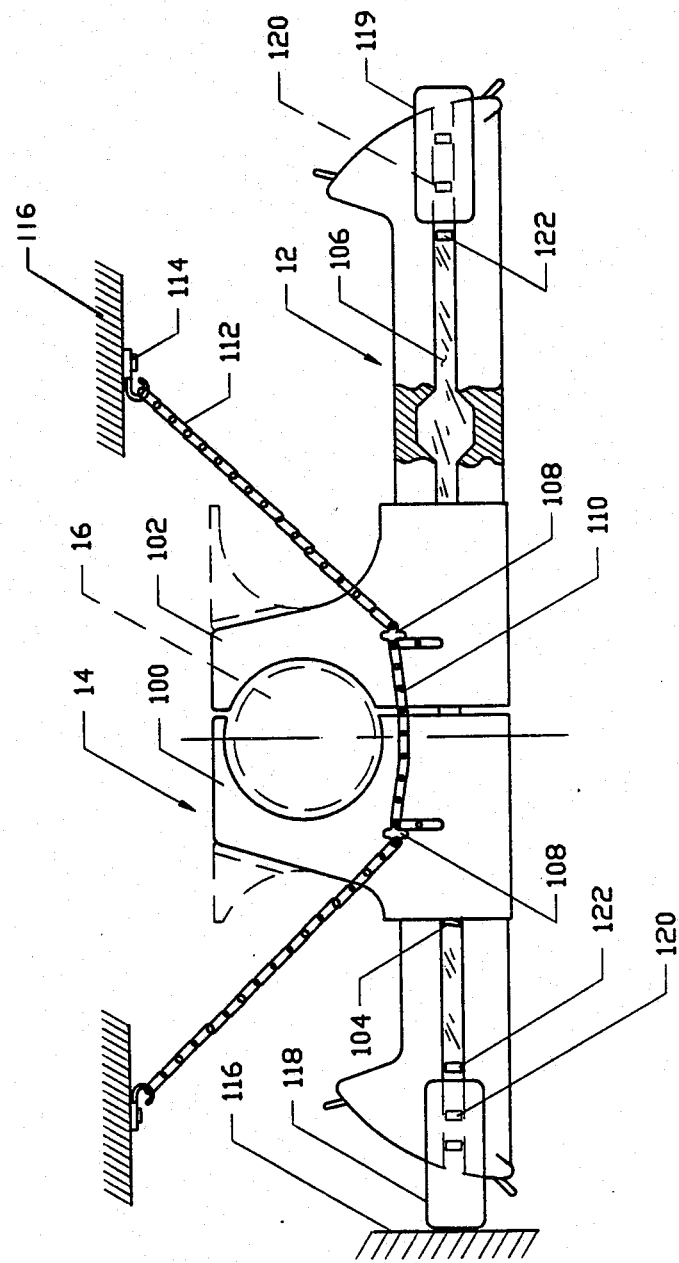
FIG. 6 is a frontal view of another embodiment of the hanger means showing its relationship with the spreader means according to the teaching of the present invention.

Still another embodiment of the hanger means 14 is shown in FIG. 6 and includes two hanger plates 100 and 102, each having a dove-tailed rail 104 slideably engaging the dove-tailed groove 106 in spreader means 12. Openings 1-8 are provided in the hanger plates 100 and 102 so plates 100 and 102 can be connected together by chain means 110 until they are to be opened, at which time chain means 110 is disengaged from one of the plates to permit opening by sliding the plates 100 and 102 apart to receive fluorescent tube 16, after which the plates 100 and 102 are again mopved together to be secured by chain means 110. Openings 108 on the hanger means 14 on the endmost spreader means 12 of the shade can also receive and hold chain means 112 that cooperate with a screw 114 and serve to position the shade 10 horizontally in the fixture 116.

An alternative to using chain means 112 to position shade 10 within the fixture 116 is to have stabilizing members 118 provided on the end- most spreader means 12 of the shade capable of being extended beyond the end of spreader means 12 to engage light fixture 116. Stabilizing means 118 has a dove-tailed rail that slideably engages the dove-tailed groove 106 in spreader means 12. Multiple indentations 120 in the dove-tailed rail of the stabilizing means 118 removably engage detents or slots 122 in the dove-tailed groove 106 of spreader means 12.

Figure 7:
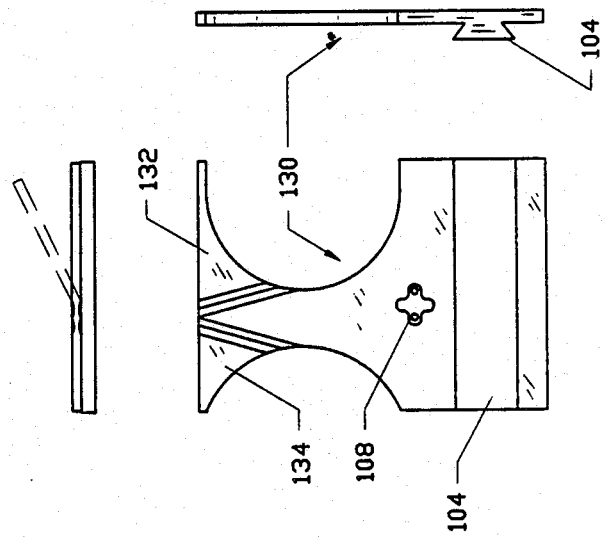
FIG. 7 shows front top and side view of a component that can be utilized to form the hanger means disclosed in FIG. 6.

FIGS. 7 and 7A show a molded part 130 that can have either projection 132 or 134 removed to form one of the two hanger plates 100 and 102 of FIG. 6. Typically, one of the projections can be scored and bent to crack away and provide a clean separation.

Figure 8:
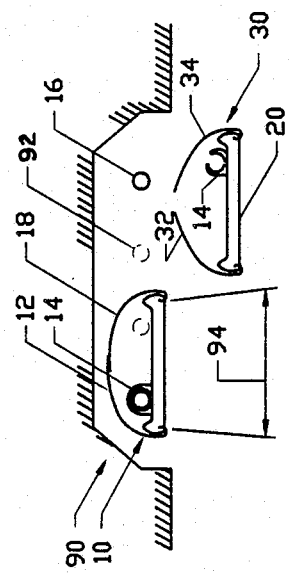
FIG. 8 is an end view of a fluorescent light fixture mounted on the ceiling of a room showing the utilization of two embodiments of the present invention.

FIG. 8 shows a fluorescent light fixture 90 with two operating fluorescent tubes 16 and two blank positions 92 where fluorescent tubes 16 have been removed. One shade 10 has been located about the fluorescent tube 16 on the left and a second shade 30 has the resilient sheet means 32 and 34 separated and the hangar means 14 open and positioned to be inserted about the fluorescent tube 16 on the right. The installed shade 10, according to the present invention, provides a narrowed (in the transverse direction) illumination pattern 94 with only one fluorescent tube 16 instead of two tubes 16. The spacing of the spreader means 12 along the length of the fluorescent tube can also be selected to provide a louver effect which will limit the illumination angle in the longitudinal direction.

Figure 9:
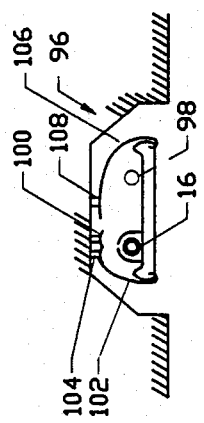
FIG. 9 is an end view of a fluorescent light fixture showing an alternate application of the present invention.

FIG. 9 illustrates an alternate manner of use of the present invention wherein a fixture 96 has been previously modified to include a commercially available top reflector strip 100 which is secured to fixture 96 by any suitable means 101. In this case, one would merely trim the edge 104 of the left side sheet 102 so that it will slip into place above an edge of strip 100. Sheet 106 would then be attached to the top of fixture 96 by means of the adhesive strip 108. The device would then function as described above except that light from the top of lamp 16 will be reflected downwardly by strip 100.

The advantages of the various embodiments of the light-weight reflecting shade of the present invention will now be discussed in detail referring to FIG. 8. The shade floods the fluorescent light over an expanded area and gives better reflection over the whole perimeter of the light fixture 90 when compared with prior art devices. The shade collects light from the top of the fluorescent bulbs by reflecting substantially all the luminous energy from the top of the associated fluorescent tube downwardly into the room. This invention further gives more uniform lighting across the fixture. Utilization of the present invention enables removal of one fluorescent tube from a two-fluorescent tube fixture (or removal of two fluorescent tubes from a four-fluorescent tube fixture, etc.) while achieving approximately the same light output as if all such tubes had been utilized.

In summary, utilization of the present invention enables achievement of approximately the same light output with half the power usage. Although the present invention has been described above relative to a particular configuration, it is to be understood that the invention can also be implemented in other configurations. Furthermore, it is anticipated that other alterations or modifications thereof will become apparent to those skilled in the art after reading this disclosure. Accordingly, it is intended that the following claims be interpreted to cover all such alternatives, alterations and modifications as fall within the true spirit and scope of the invention.

What is claimed is:

1. A light-weight reflecting shade for mounting on a fluorescent tube normally disposed within a ceiling light fixture and capable of increasing the luminous output of said fixture comprising:

a plurality of elongated spreader means disposed in spaced apart parallel relationship;

hanger means slideably connected to selected ones of said spreader means, movable along the length of said spreader means, and adapted to receive and attach to said fluorescent tube;

resilient sheet means having a reflective surface and a first dimension substantially equal to the length of said fluorescent tube, and a second dimension substantially greater than the length of said spreader means, said sheet means having at least one lateral edge adapted to removably engage one end of each of said spreader means and having a second lateral edge adapted to engage the other end of each of said spreader means so that when said sheet means is attached to said spreader means and extends above the top of said fluorescent tube, the reflective surface of said sheet means provides a curved reflector for reflecting downwardly, substantially all of the luminous energy radiated from the upper surface of said tube.

2. A light-weight reflecting shade according to claim 1 in which the resilient sheet means is comprised of a single sheet, the edges of which are folded and adapted for insertion into slots formed in the ends of said spreader means.

3. A light-weight reflecting shade according to claim 1 in which the resilient sheet means is comprised of two sheets with each of said sheets having one lateral edge adapted for attachment to said spreader means and the other lateral edge of each of said sheets being removably attached to each other.

4. A light-weight reflecting shade according to claim 1 in which at least a portion of the hanger means has a dove-tailed rail that slideably engages a dove-tailed groove formed in the spreader means.

5. A light-weight reflecting shade according to claim 4 in which the hangar means includes two hangar plates pivotally connected to each other, said plates being configured such that facing portions thereof define a cavity to receive and hold a fluorescent tube, one of said hanger plates being slideably connected to the spreader means and the other hanger plate being capable of being pivoted between an open position enabling placing of the cavity forming portions of the hanger means adjacent of the fluorescent tube, and a closed position for securing the fluorescent tube in the cavity of the hanger means.

6. A light-weight reflecting shade according to claim 4 in which the hanger means includes two hanger plates slideably connected to the spreader means, said plates being configured such that facing portions thereof define a cavity to receive and hold a fluorescent tube, said plates being capable of being slideably separated and said hanger plates being removably fastened together by chain means.

7. A light-weight reflecting shade according to claim 1 in which the hanger means is a single component having a hook portion for hookably engaging the fluorescent tube, said hanger means having a rounded dove-tailed rail slideably engaging a dove-tailed groove in said spreader means, said dove-tailed groove running the lateral distance of said spreader means, and said hanger means having spaced apart detents adapted to engage the dove-tailed groove in said spreader means when the hanger means is pivoted from one position to the other, with one said position being removed from the fluorescent tube and the other position being capable of enclosing about to the fluorescent tube.

8. A light-weight reflecting shade according to claim 1 that further includes positioning means for securing said shade in a substantially horizontal position in a light fixture.

9. A light-weight reflecting shade according to claim 8 in which the positioning means is a chain means connected to the hanger means on each of the end most spreader means of said shade, said chain means being adapted to be connected to the fixture housing the fluorescent tube.

10. A light-weight reflecting shade according to claim 8 in which the positioning means is a stabilizing member slideably engaging each of the end-most spreader members and each stabilizing member being capable of being positioned in a multiplicity of different positions along said spreader means, so that said stabilizing means is capable of extending beyond the edge of said spreader means to engage the fixture housing the fluorescent tube.

11. A light-weight reflecting shade according to claim 1 wherein said spreader means are selectively positionable along the longitudal direction of the fluorescent tube to which the shade is mounted.

12. A light-weight reflecting shade according to claim 11 wherein said spreader means collectively form a louver-like means for restricting the illumination angle in the longitudanal direction of the fluorescent tube.

13. A light-weight reflecting shade according to claim 12 wherein said resilient sheet means causes the illumination angle in the direction transverse to the fluorescent tube to be selectively restricted.

14. A light-weight reflecting shade according to claim 1 wherein said resilient sheet means causes the illumination angle in the direction transverse to the fluorescent tube to be selectively restricted.

* * * * *